United States Patent
Rusakovich

(10) Patent No.: US 12,130,727 B2
(45) Date of Patent: Oct. 29, 2024

(54) CORE DUMP IN MULTIPROCESSOR DEVICE

(71) Applicant: SK hynix Inc., Icheon-si (KR)

(72) Inventor: Siarhei Rusakovich, Minsk (BY)

(73) Assignee: SK hynix Inc., Icheon-si (KR)

( * ) Notice: Subject to any disclaimer, the term of this patent is extended or adjusted under 35 U.S.C. 154(b) by 192 days.

(21) Appl. No.: 17/661,010

(22) Filed: Apr. 27, 2022

(65) Prior Publication Data

US 2023/0350786 A1 Nov. 2, 2023

(51) Int. Cl.
*G06F 11/00* (2006.01)
*G06F 11/36* (2006.01)

(52) U.S. Cl.
CPC .................... *G06F 11/366* (2013.01)

(58) Field of Classification Search
CPC .......................... G06F 11/366; G06F 11/0778
USPC ........................................................ 714/1–57
See application file for complete search history.

(56) References Cited

U.S. PATENT DOCUMENTS

| | | | |
|---|---|---|---|
| 6,067,407 A * | 5/2000 | Wadsworth | G06F 11/2294 709/224 |
| 6,199,179 B1 | 3/2001 | Kauffman et al. | |
| 6,681,348 B1 | 1/2004 | Vachon | |
| 6,857,084 B1 * | 2/2005 | Giles | G06F 11/3648 714/E11.213 |
| 6,948,094 B2 | 9/2005 | Schultz et al. | |
| 7,275,180 B2 | 9/2007 | Armstrong et al. | |
| 7,484,127 B2 | 1/2009 | Babu | |
| 7,574,627 B2 | 8/2009 | Ogasawara et al. | |
| 8,090,984 B2 | 1/2012 | Moyer et al. | |
| 9,436,536 B2 | 9/2016 | Ogino et al. | |
| 10,157,155 B2 | 12/2018 | Raffman et al. | |
| 11,226,755 B1 * | 1/2022 | Douglass | G06F 3/0659 |
| 2005/0223302 A1 * | 10/2005 | Bono | G06F 11/0757 714/E11.003 |
| 2008/0005609 A1 * | 1/2008 | Zimmer | G06F 11/0748 714/5.11 |
| 2008/0046891 A1 | 2/2008 | Sanchorawala et al. | |
| 2008/0155307 A1 * | 6/2008 | French | G06F 11/2089 714/3 |

(Continued)

OTHER PUBLICATIONS

Nezzari Y., et al., "Compiler Extensions towards Reliable Multicore Processors", 2017 IEEE Aerospace Conference, 2017, pp. 1-6, doi: 10.1109/AERO.2017.7943714.

*Primary Examiner* — Sarai E Butler
(74) *Attorney, Agent, or Firm* — Weaver Austin Villeneuve & Sampson LLP

(57) ABSTRACT

Techniques for obtaining a device core dump in a multiprocessor device may include detecting an occurrence of an error in a processor of a multiprocessor device, and trigger an inter-processor interrupt from the processor in which the error occurred to each of the other processors of the multiprocessor device to halt operation of the multiprocessor device. Processor core dumps corresponding to the processors can then be stored in a memory subsystem. A determination can be made that a data ready indication for each of the processors has been set to indicate that the corresponding processor core dump has been stored in the memory subsystem. The processor core dumps can then be copied from the memory subsystem to a non-volatile memory to generate a device core dump in the non-volatile memory.

19 Claims, 9 Drawing Sheets

(56) References Cited

U.S. PATENT DOCUMENTS

| | | | |
|---|---|---|---|
| 2009/0228743 A1* | 9/2009 | Ponnuswamy | G06F 12/1027 |
| | | | 714/48 |
| 2010/0251017 A1 | 9/2010 | Yamada et al. | |
| 2011/0173426 A1* | 7/2011 | Moore | G06F 9/4401 |
| | | | 714/48 |
| 2011/0225458 A1* | 9/2011 | Zuo | G06F 11/362 |
| | | | 718/1 |
| 2012/0151252 A1* | 6/2012 | Harris | G06F 12/08 |
| | | | 714/6.13 |
| 2013/0179532 A1* | 7/2013 | Tameshige | G06F 15/167 |
| | | | 709/213 |
| 2014/0089943 A1* | 3/2014 | Harikumar | G06F 9/542 |
| | | | 719/318 |
| 2014/0298041 A1* | 10/2014 | Consalus | G06F 21/602 |
| | | | 713/193 |
| 2016/0012246 A1* | 1/2016 | Allen | G06F 9/45558 |
| | | | 726/17 |
| 2016/0364317 A1* | 12/2016 | Rehman | G06F 11/3664 |
| 2017/0220406 A1* | 8/2017 | Parnell | G06F 11/14 |
| 2019/0258501 A1* | 8/2019 | Tsirkin | G06F 11/3037 |
| 2021/0357221 A1* | 11/2021 | Raj | G06F 9/4812 |

* cited by examiner

CORE DUMP IN MULTIPROCESSOR DEVICE

BACKGROUND

A core dump is a snapshot of the state of a computing system. A core dump is generally captured at the time of a system crash for failure analysis and debug to determine the cause of the crash. When a crash occurs, the computing system may not be able continue to operate normally. In such cases, to make failure analysis possible, the current system state is saved in a special mode such that the snapshot can be subsequently retrieved to analyze the problem.

BRIEF SUMMARY

Techniques for obtaining a device core dump in a multiprocessor device may include detecting an occurrence of an error in a processor of a multiprocessor device, and trigger an inter-processor interrupt from the processor in which the error occurred to each of the other processors of the multiprocessor device to halt operation of the multiprocessor device. Processor core dumps corresponding to the processors can then be stored in a memory subsystem. A determination can be made that a data ready indication for each of the processors has been set to indicate that the corresponding processor core dump has been stored in the memory subsystem. The processor core dumps can then be copied from the memory subsystem to a non-volatile memory to generate a device core dump in the non-volatile memory.

In some implementations, a device that utilizes the device core dump techniques may include a non-volatile memory, a memory subsystem, multiple processors, and an interrupt controller. The interrupt controller is operable to broadcast an inter-processor interrupt in response to the occurrence of the error to halt operation of the device. Each processor may include core dump logic that is operable to perform operations including storing a processor core dump in the memory subsystem for the corresponding processor in response to an occurrence of an error in the device, and setting a data ready indication in the memory subsystem upon completion of storing the processor core dump.

In some implementations, a designated processor may generate a device core dump in the non-volatile memory by performing various operations. These operations may include determining an occurrence of an error in the device, and monitoring a set of data ready indicators, each of which indicates whether a processor core dump for a corresponding processor of the device has been stored in a memory subsystem. For each of the data ready indicator that is asserted, a processor core dump for the corresponding processor can be copied from the memory subsystem into a non-volatile memory to generate the device core dump. A header for the device core dump can also be stored in the non-volatile memory.

BRIEF DESCRIPTION OF THE DRAWINGS

Various embodiments in accordance with the present disclosure will be described with reference to the drawings, in which.

DETAILED DESCRIPTION

Figure 1:
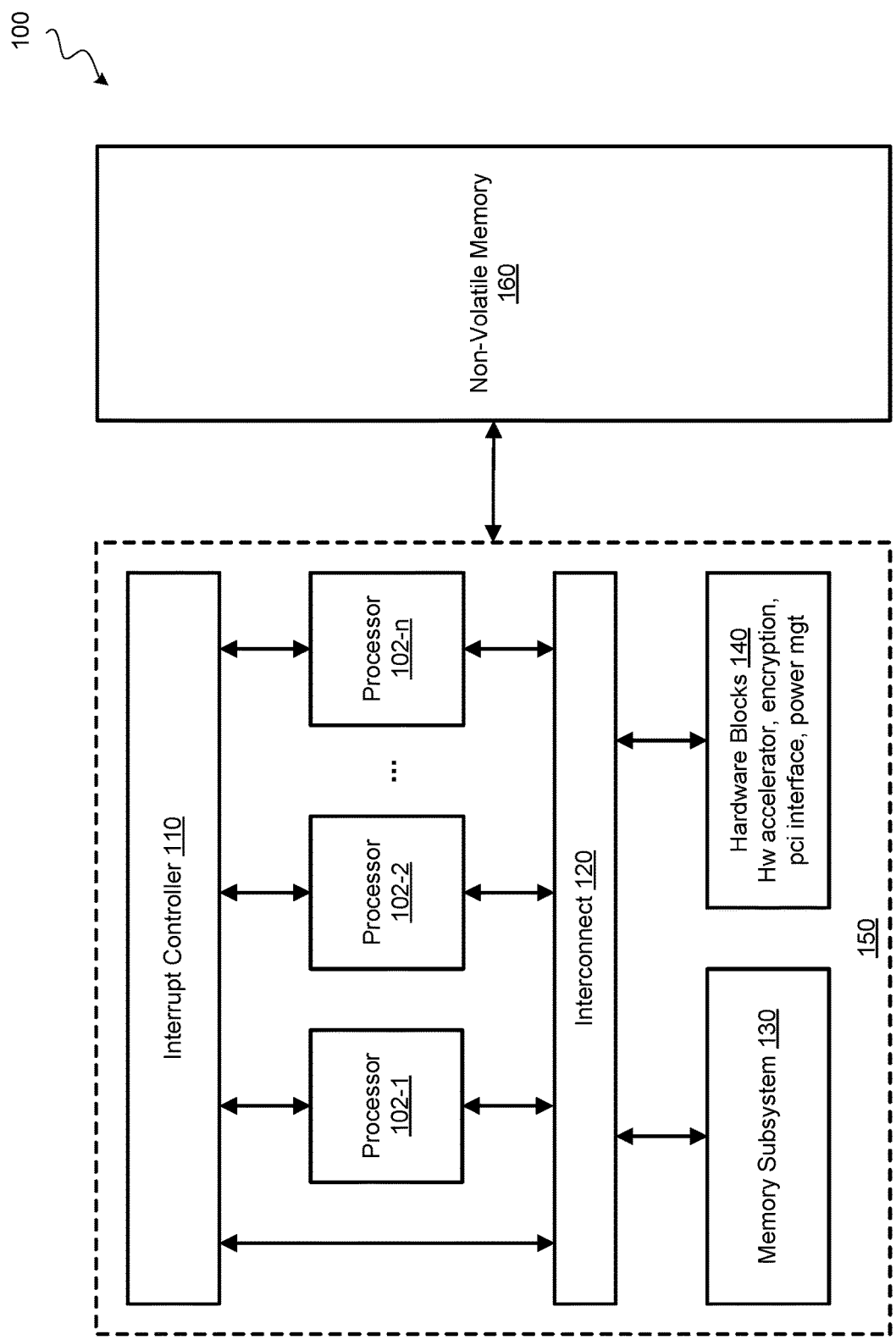
FIG. 1 illustrates a block diagram of an example of an electronic device.

An electronic device may include multiples processors, which can be processors of the same and/or different architectures (e.g., ARM, Xtensa, etc.). In the event of an error that causes a device crash such that the electronic device can no longer operate normally, it is preferable to prevent any subsequent changes to the state of the device such that a core dump of the device reflects the device state (e.g., state of processors, memory, hardware modules, etc.) as close in time to the crash as possible. During the debug process, having a core dump in close proximity to the time of the crash can improve the likelihood of properly identifying the root cause of the device error, and reduce the debug time because the amount of back-tracing can be reduced.

For electronic devices that are managed by an operating system, the task of halting all processors may fall on the operating system kernel. However, some operating systems may lack the capability to manage processors of different architectures or may lack the capability to halt all processors in the device. Furthermore, not all electronic devices are managed by an operating system. As such, a different mechanism may be needed to stop execution of the main program on all processors as synchronously as possible, and to stop all hardware blocks in their current state as close as possible in time to the occurrence of the device error causing a crash.

The techniques disclosed herein provide a mechanism to halt all processors in a multiprocessor device and generate a device core dump in the event of a device error causing a crash. The techniques can be used in a device having processors of different architectures, and do not rely on an operating system. Thus, the device core dump techniques can be employed in devices with or without a functioning operating system. By way of example, the device core dump techniques may include detecting an occurrence of an error in a processor of the multiprocessor device, and triggering an inter-processor interrupt from that processor to each of the other processors of the multiprocessor device to halt operation of the device. Processor core dumps corresponding to each of the processors can then be stored in a memory subsystem (e.g., random access memory). When storing of each of the processor core dumps is complete, a device core dump can be generated by copying the processor core dumps from the memory subsystem to a non-volatile memory. The device core dump can then be retrieved from the non-volatile memory to debug the cause of the error that resulted in the device crash.

In the description provided herein, for the purposes of explanation, specific details are set forth in order to provide a thorough understanding of certain inventive embodiments. However, it will be apparent that various embodiments may be practiced without these specific details. Hence, the figures and description are not intended to be restrictive.

A device error resulting in a crash can be caused by software errors and/or hardware failures. Software errors can occur during code execution of a processor (e.g., division by zero, access to an invalid address, etc.). Software errors can also cause commands to be incorrectly configured or incorrectly sent to hardware blocks in the device. In such scenarios, a hybrid crash caused by both hardware and software may occur.

A device error resulting in a crash can also be caused by a hardware fault, which may occur due to errors in the logic and/or circuit implementation of the hardware unit, or other external factors affecting the operating conditions of the hardware (e.g., temperature, radiation, etc.). Such hardware faults can be handled by error handlers of the hardware blocks that trigger the error interrupt in a processor. If there is no error handler in the hardware block, the associated error can manifest as a logical error in a processor or as a hardware error in a downstream hardware block. In the latter case, if the downstream hardware block supports an error interrupt, the error will be handled by the error handler of the downstream hardware block.

Another source of device error can be logical errors in a program that are caught by runtime checks implemented in the software code being executed. Unlike software errors that cause the software execution to hang, logical errors triggered by these runtime checks are part of the software execution and are implemented in the software code. Such runtime checks are typically coded as ASSERT statements that check for certain conditions at runtime. Depending on whether the condition is met during runtime, the ASSERT instruction can be executed to cause the processor to generate a core dump. Regardless of which type of device error including those described above is the cause of a device crash, a core dump can be used to investigate the source of the error.

Program executions on different processors are usually not synchronized. To properly analyze a failure in a multi-processor device, core dumps containing the state of the processors and hardware blocks are preferably captured as close in time with each other as possible. The core dump can be generated by error handling logic implemented in hardware, software, or a combination of both. Part of the core dump task is to stop code execution on each of the processors and hardware blocks in the device.

One drawback of existing core dump mechanisms is that they do not save the states of all processors and available hardware blocks in the device. Instead, only the states of a minimum set of resources and hardware available in the processor in which the error occurred are captured. As compared to such mechanisms, the techniques disclosed herein can be used to capture the core dumps of all processors in the device, regardless of which processor the error occurred in. The device core dump may include the closest in time state of the necessary hardware blocks, processor registers, and memory dumps of each of the processors. This allows more complete information about the device to be provided at the time of the crash to facilitate failure analysis.

FIG. 1 illustrates an example of an electronic device 100 that may utilize the core dump techniques disclosed herein. In some implementations, electronic device 100 can be a storage device such as a solid-state drive (SSD) device. In other implementations, electronic device 100 can be other types of peripheral device and/or computing device. Electronic device 100 may include multiple processors 102-1 to 102-n, a memory subsystem 130, one or more hardware blocks 140, and an interrupt controller 110 coupled to an interconnect 120. Electronic device 100 may also include a non-volatile memory 160. In some implementations, these components can form a controller 150 that controls the operation of non-volatile memory 160.

Processors 102-1 to 102-n may include two or more processors, and some of the processors can be of the same architecture and/or some of the processor can be of different architecture. For example, processor 102-1 can be an ARM-based processor, and processor 102-2 can be a Xtensa-based processor. An electronic device such as a SSD device may include processors of different architectures to perform different functions. For example, an ARM-based processor can be used to manage the general operations of non-volatile memory 160 such as to convert commands to read and write operations and to perform address translation. The ARM-based processor can also be used to perform background tasks such as garbage collection, wear leveling, etc. A Xtensa-based processor can be used to perform hardware acceleration for application specific tasks such as digital signal processing operations on data stored in non-volatile memory 160 (e.g., video encoding/decoding). More generally, one or more processors can be used to implement a hardware accelerator such as a cryptoprocessor, graphics processor, packet processor, etc.

Memory subsystem 130 may include random access memory to facilitate the operation of processors 102-1 to 102-n. Memory subsystem 130 can be implemented using random access memory such as static random access memory (SRAM), dynamic random access memory (DRAM), or a combination of both. In some implementations, memory subsystem 130 may include specific memory devices and/or specific memory partitions or regions assigned to each processor, or memory subsystem 130 can be a shared amongst processors 102-1 to 102-n. Memory subsystem 130 can be used, for example, to store firmware used by the electronic device and/or other data or software such as codecs, cryptographic algorithms and associated keys, etc.

Hardware blocks 140 may include components such as one or more interface circuitry blocks, power management circuitry, and/or other accessory or peripheral circuitry. Examples of interface circuitry blocks may include circuitry blocks to support interface protocols such as peripheral component interconnect express (PCIe), universal serial bus (USB), universal asynchronous receiver-transmitter (UART), system management bus (SMBus), serial advanced technology attachment (SATA), etc. In some implementations, an interface circuitry block (e.g., implementing a PCIe interface) can be used as a host interface to allow electronic device 100 to communicate with a host system. The host system may issue commands to read or write to non-volatile memory 160 via the host interface. At least some of the hardware blocks 140 may detect errors and generate interrupts to one or more of processors 102-1 to 102-n. If the error detected by a hardware block is severe enough, the processor handling the error from the hardware block may trigger a device core dump.

Interrupt controller 110 may include circuitry to manage the interrupt requests from the components of electronic device 100. For example, interrupt controller 110 may direct interrupts to specific processors and/or broadcast interrupts to each processor of electronic device 100. In some implementations, interrupt controller 110 may include programmable interrupt policies to set different priorities and/or severity levels for the interrupts, and determine an order in which pending interrupts are processed. In relation to generating a device core dump in the event of a crash, interrupt controller 110 can be used to broadcast an interrupt from a processor in which the error occurred to the other processors of electronic device 110 such that the code execution and operation of each of the processors 102-1 to 102-n can be halted as quickly as possible.

Non-volatile memory 160 can be implemented using, for example, one or more non-volatile memory devices such as flash memory devices (e.g., NAND flash). Each memory device may include a memory cell region. The memory cell region may include multiple memory blocks, and each of the memory blocks may include multiple pages. For example, memory cells on the same word line can be configured as a page that is read and written (or programmed) simultaneously. In some implementations, the memory cells can be single level cell (SLC), multi-level cell (MLC), triple level cell (TLC), quad-level cell (QLC), or other cell types.

Figure 2:
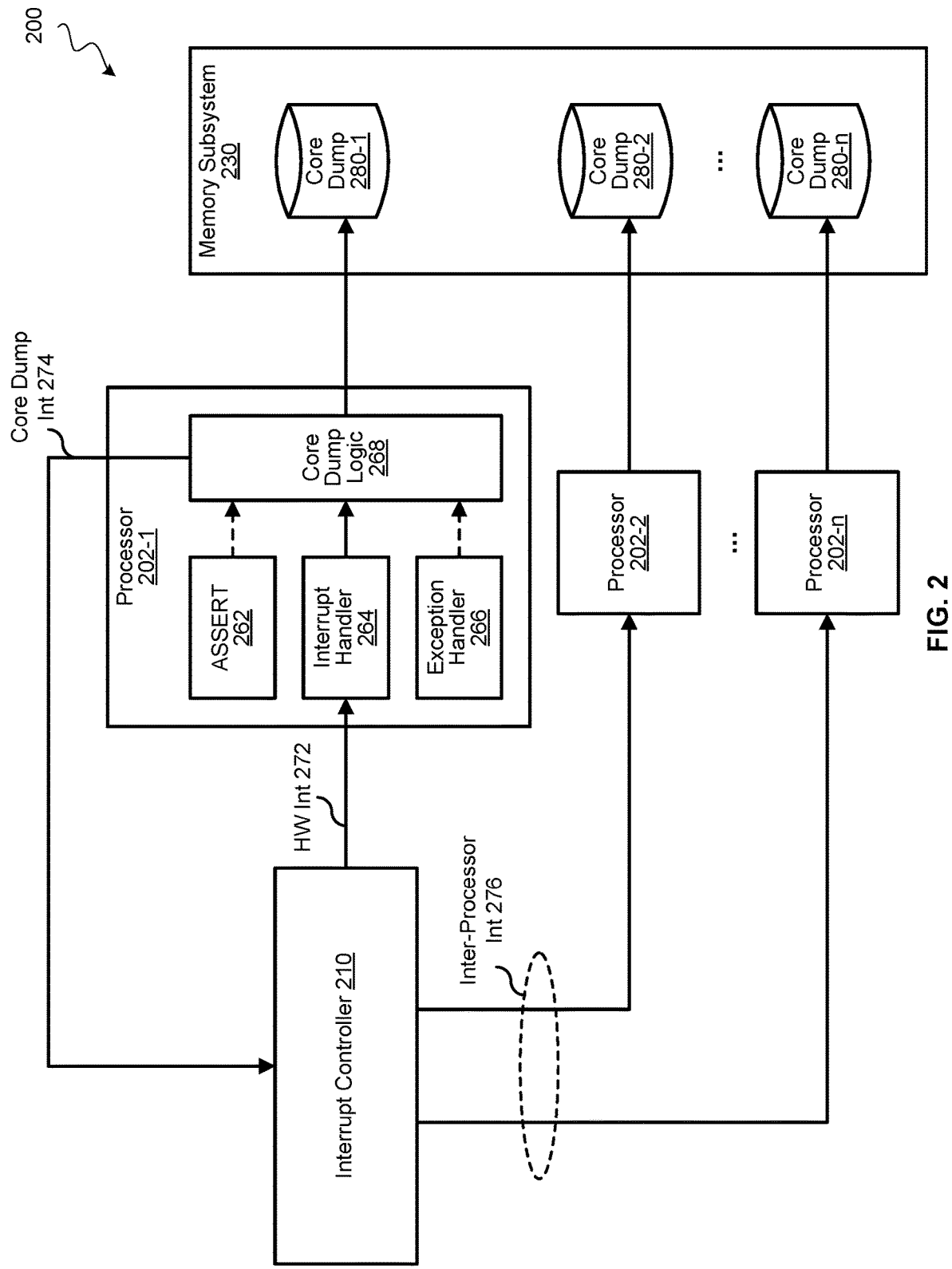
FIG. 2 illustrates a conceptual diagram of an example of core dump generation.

FIG. 2 illustrates a conceptual diagram of an electronic device 200 generating a core dump as a result of a device error. Electronic device 200 is implemented using one or more integrated circuit devices and is similar to electronic device 100, and thus a detailed description of similar components need not be repeated. Moreover, although some components shown in FIG. 1 have been omitted from FIG. 2, it should be understood that electronic device 200 may include one or more components not specifically shown in FIG. 2. In other implementations, electronic device 200 may also omit one or more components shown in FIG. 2.

Electronic device 200 may include multiple processors 202-1 to 202-n, an interrupt controller 210, and a memory subsystem 230. Electronic device 200 may also include a non-volatile memory (not shown). Processor 202-1 may include an ASSERT instruction handler 262, an interrupt handler 264, and an exception handler 266. Any of these handlers can invoke core dump logic 268, which is operable to store a processor core dump 280-1 in memory subsystem 230 for the corresponding processor 202-1 in response to the occurrence of an error in electronic device 200. Although not shown in FIG. 2, each of the other processors 202-2 to 202-n may include similar handlers and core dump logic to handle the various types of errors and generate a processor core dump for the corresponding processor.

When a software error occurs in processor 202-1, exception handler 266 can be called to handle the failure. Depending on the processor architecture, processor 202-1 may include one or more exception handlers (e.g., to handle different types of software errors and/or errors at different levels of the software stack. Exception handler 266 can analyze the failure to determine the severity level of the software error. If the error is severe enough to result in the creation of a processor core dump, exception handler 266 can invoke core dump logic 268. If a failure occurred in the hardware (e.g., a hardware block or from another processor), a hardware interrupt can be triggered and analyzed by interrupt handler 264. Similarly, if the severity level of the hardware error warrants the generation of a processor core dump, interrupt handler 264 can invoke core dump logic 268. If the failure was a logical error caught by a runtime check, the code execution of the ASSERT instruction handler 262 can invoke core dump logic 268. Accordingly, any of these types of errors (e.g., software errors, hardware errors, logical errors) or a combination thereof can trigger a processor core dump by invoking core dump logic 268.

The process of generating a device core dump will now be described using a hardware error example. It should be understood that a similar process can be used to generate a device core dump resulting from a software error or a logical error. Referring to FIG. 2, a hardware error (e.g., from a hardware block of electronic device 200) may trigger a hardware interrupt 272. Interrupt controller 210 may receive an indication of the error from the hardware source, and determine that processor 202-1 is the processor to handle the error. Interrupt controller 210 then sends the hardware interrupt 272 to processor 202-1. Upon receiving the hardware interrupt 272, the interrupt handler 264 of processor 202-1 can determine that the error warrants a core dump and invoke core dump logic 268.

If the error occurred in processor 202-1 (e.g., software or logical error) or is directed to processor 202-1 as in this hardware interrupt example, the first priority of the core dump logic 268 is to assert a core dump interrupt 274 to interrupt controller 210. In response to the core dump interrupt 271 signaling the occurrence of an error to trigger a core dump, interrupt controller 210 can broadcast an inter-processor interrupt 276 to each of the other processors 202-2 to 202-n to halt the operation of electronic device 200. The inter-processor interrupt 276 can be handled by the interrupt handler of the processor receiving the interrupt to invoke the core dump logic of the corresponding processor. Such inter-processor interrupt 276 is handled as a high priority interrupt to halt the main task of the processor and to immediately save the processor and environment states including hardware blocks and memory.

Referring back to processor 202-1, when core dump logic 268 is invoked, core dump logic 268 can collect all available information to generate a processor core dump 280-1 for storage in the random access memory of memory subsystem 230. The processor core dump 280-1 can be saved to a specific location (e.g., specific address) reserved for the purpose of storing the core dump of processor 202-1. In some implementations, each processor of electronic device 200 may have a predetermined location in memory subsystem 230 to store a corresponding processor core dump.

The information being stored in the processor core dump 280-1 can include data stored in memory regions (e.g., may include cache) available to processor 202-1 that may be needed for failure analysis, registers of available hardware blocks, as well as a data structure containing information about the failure (e.g., type of error, where it occurred, as well as other parameters if applicable). This data structure can be part of the memory region already being saved by the processor core dump. Hence, in such scenarios, no additional steps are needed to save the data structure. Processor registers can also be saved to processor core dump 280-1 in memory subsystem 230 for the subsequent construction of the program execution stack and the state of hardware registers. Upon completion of collecting the core dump information and storing the processor core dump 280-1 to memory subsystem 230, core dump logic 268 can set a data ready indication (e.g., a ready flag or ready bit) in the memory subsystem 230 to indicate that the processor core dump data is ready. A similar process can be performed by the other processors 202-2 to 202-n of electronic device 200 to generate respective processor core dumps 280-2 to 280-n for storage in memory subsystem 230 in response to the inter-processor interrupt 276.

A designated processor of electronic device 200 (e.g., can be any of processor 201-1 to 202-n that can access the non-volatile memory) may then generate a device core dump by copying the processor core dump of each processor (e.g., processor core dump 280-1 to 280-n) from the memory subsystem 230 into the non-volatile memory. In some implementations, the designated processor can copy the processor core dump of a processor upon verifying that the data ready indication for that processor has been set. For example, the designated processor may poll the data ready indications, and copy the processor core dumps having their data ready indication set into the non-volatile memory. In some implementations, the copying of the processor core dumps from the memory subsystem 230 to the non-volatile memory can be performed after a predetermined timeout period has elapsed from the time of the crash. It should also be noted that in some implementations, the designated processor can omit storing its own processor core dump in memory subsystem 230, and instead store the processor core dump into the non-volatile memory directly.

Figure 3:
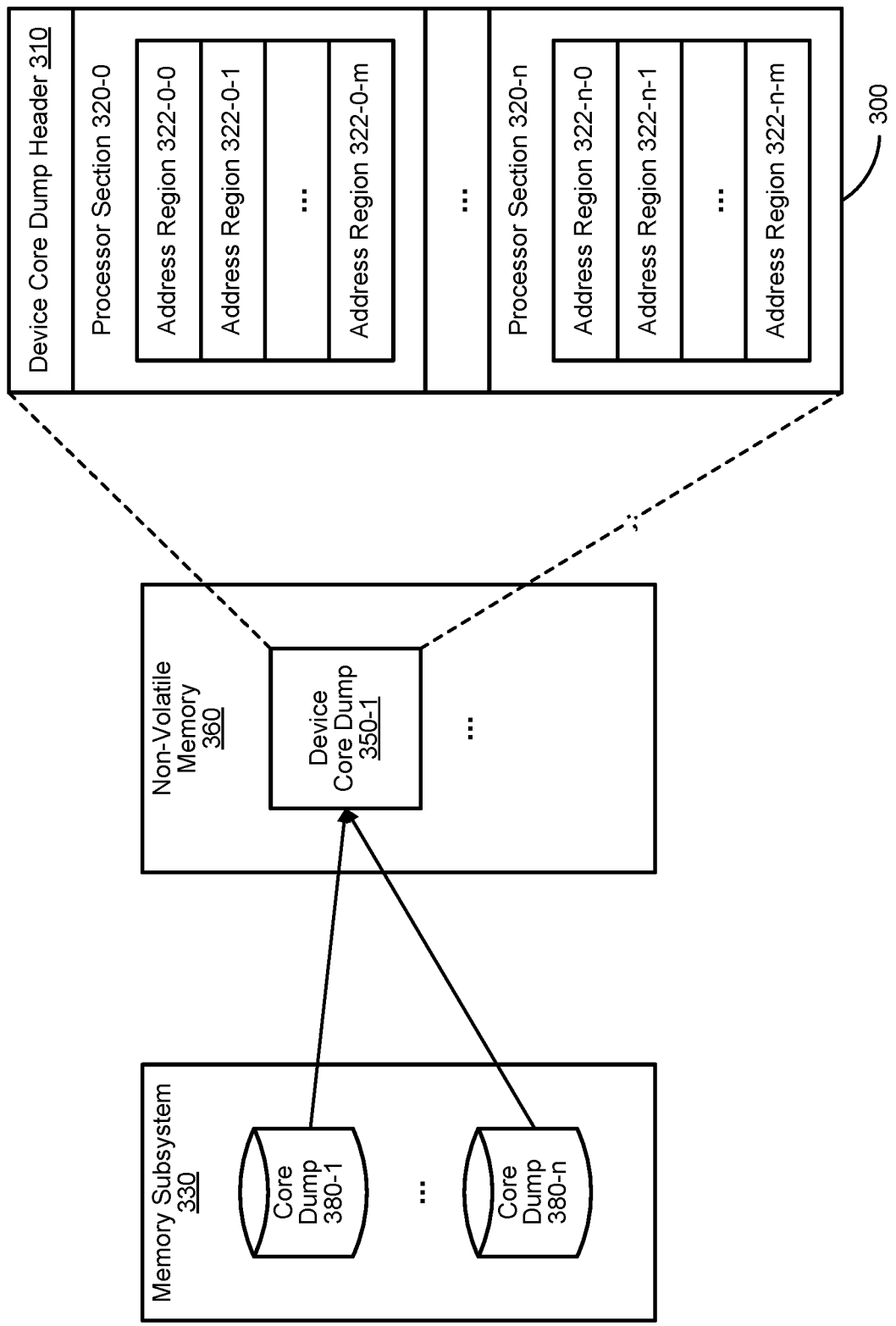
FIG. 3 illustrates a block diagram of an example of contents of a core dump.

FIG. 3 illustrates a conceptual diagram of a data structure 300 of a device core dump 350-1. As described above, the processor core dump of each processor of the multiprocessor electronic device can be copied from the random access memory of the memory subsystem to generate a device core dump for storage in a non-volatile memory. For example, processor core dump 380-1 to 380-$n$ can be copied from memory subsystem 330 of the electronic device (e.g., memory subsystem 230 of electronic device 200) to generate device core dump 350-1 for storage in non-volatile memory 360. Non-volatile memory 360 may include a designated region or a reserved area for storing device core dumps.

The data structure 300 of device core dump 350-1 may include a device core dump header 310, and multiple processor sections 320-0 to 320-$n$. Each processor section corresponds to a processor core dump of a processor. Each of the processor sections 320-0 to 320-$n$ contains the detailed description of the state of the corresponding processor, a count of the number of address space regions contained in the processor section, and the corresponding address space regions. For example, processor section 320-0 may include address space regions 322-0-0 to 322-0-$m$, and processor section 320-$n$ may include address space regions 322-$n$-0 to 322-$n$-$m$. It should be noted that different processor sections can have different number of address space regions. Each address space region may include a local address in the address space of the corresponding processor, the data retrieved from that local address, and the size of the data retrieved from the local address.

The device core dump header 310 can include information about the device core dump to facilitate parsing and analysis. For example, the device core dump header 310 may include a value representing the number of processor sections included in device core dump 350-1. In some implementations, processors that do not have an asserted data ready indicator may not have a process core dump saved to device core dump 350-1. Hence, by providing the number of processor sections included in the device core dump header 310, a determination can be made as to whether every processor in the electronic device has successfully saved their processor core dump in the event of a crash.

The device core dump header 310 may also include a sequence number associated with the device core dump 350-1. In some implementations, multiple sequential device core dumps can be saved to non-volatile memory 360. This may occur, for example, if the electronic device is encountering repeated device crashes. The sequence number can be used to indicate the order in which the device core dumps are stored to reconstruct the history of the electronic device through multiple crashes and reboots.

Depending on the amount of information in a device core dump, there can be a limit to the number device core dumps that can fit in the space in non-volatile memory 360 allocated for storing device core dumps. As such, the device core dump header 310 may further include a capacity flag indicating whether the non-volatile memory 360 has sufficient capacity to store a subsequent device core dump. The capacity flag of the most recent device core dump header can be checked when the electronic device is rebooted to determine which mode of operation the electronic device will be restarted into as further described below.

When the electronic device is started (e.g., rebooted after a crash), the non-volatile memory area designated for device core dump is checked to determine if any device core dump has been stored in response to a prior error resulting in a device crash. If no device core dump is detected, the electronic device can boot to normal operation. If at least one device core dump is detected and the capacity flag of the most recent device core dump is not asserted, the electronic device can boot into a limited functionality mode. If at least one device core dump is detected and the capacity flag of the most recent device core dump is asserted to indicate that the last possible device core dump has already been stored, the electronic device can boot into an emergency mode of operation.

In the limited functionality mode of operation, the electronic device provides the functionality for uploading the device core dump(s) to outside the device (e.g., via a debug interface such as UART or SMBus, or via a normal communication interface such as PCIe or SATA, etc.). In addition, the electronic device provides a minimum set of basic device functionality. This functionality prevents changes from being made to the configuration and operating data in the electronic device. In this mode of operation, it is possible to obtain the configuration and operating data from the electronic device. If a failure occurs during operation in this mode, a new device core dump is created and stored in non-volatile memory. This can occur as long as there are failures and there is space in non-volatile memory allocated to save the device core dump. The last possible device core dump will assert the capacity flag, and the electronic device will switch to the emergency mode of operation upon restart.

In the emergency mode of operation, the electronic device provides the functionality for uploading the device core dump(s) to outside the electronic device, similar to the limited functionality mode. However, the rest of device operating functionality can be completely disabled in the emergency mode of operation. In this mode of operation, a subsequent and repeated device crash is likely to occur. To ensure that the device core dump(s) have an opportunity to be uploaded to an external device for further debug and analysis, the electronic device can implement an auto-restart that is triggered after a predetermined timeout duration has elapsed. This can prevent the electronic device from being locked out from reading the non-volatile memory due to the repeated device crash, as each restart provides an opportunity to read out the device core dump(s).

As mentioned above, the device core dump(s) can be uploaded via a debug or communication interface for analysis using a simulator or software debugging system. For example, the device core dump(s) can be uploaded to an external device via UART or SMBus, or via working communication channels such as PCIe or SATA. In some implementations, a debug port can also be used to retrieve the device core dump(s). The upload process may utilize functionality that provides reading the non-volatile memory and working with the selected interface intended for uploading the device core dump(s). A debug protocol can be implemented to obtain the list of saved device core dump(s), access their headers, and read the contents of any selected core dump. In some scenarios, the amount of data in a device core dump can be quite large while the transfer rate over some interfaces can be low. As such, the debug protocol for obtaining the device core dump(s) may include the capability to selectively read in blocks of data from any memory location storing the device core dump(s). For example, if an error causes the electronic device to repeatedly crash after each reboot, the debug protocol can read in different portions of the device core dump(s) after each reboot until the requisite data has been retrieved. In some implementations, the debug protocol may also provide functionality to erase the device core dumps from the non-volatile memory for device development and testing stages.

Figure 4:
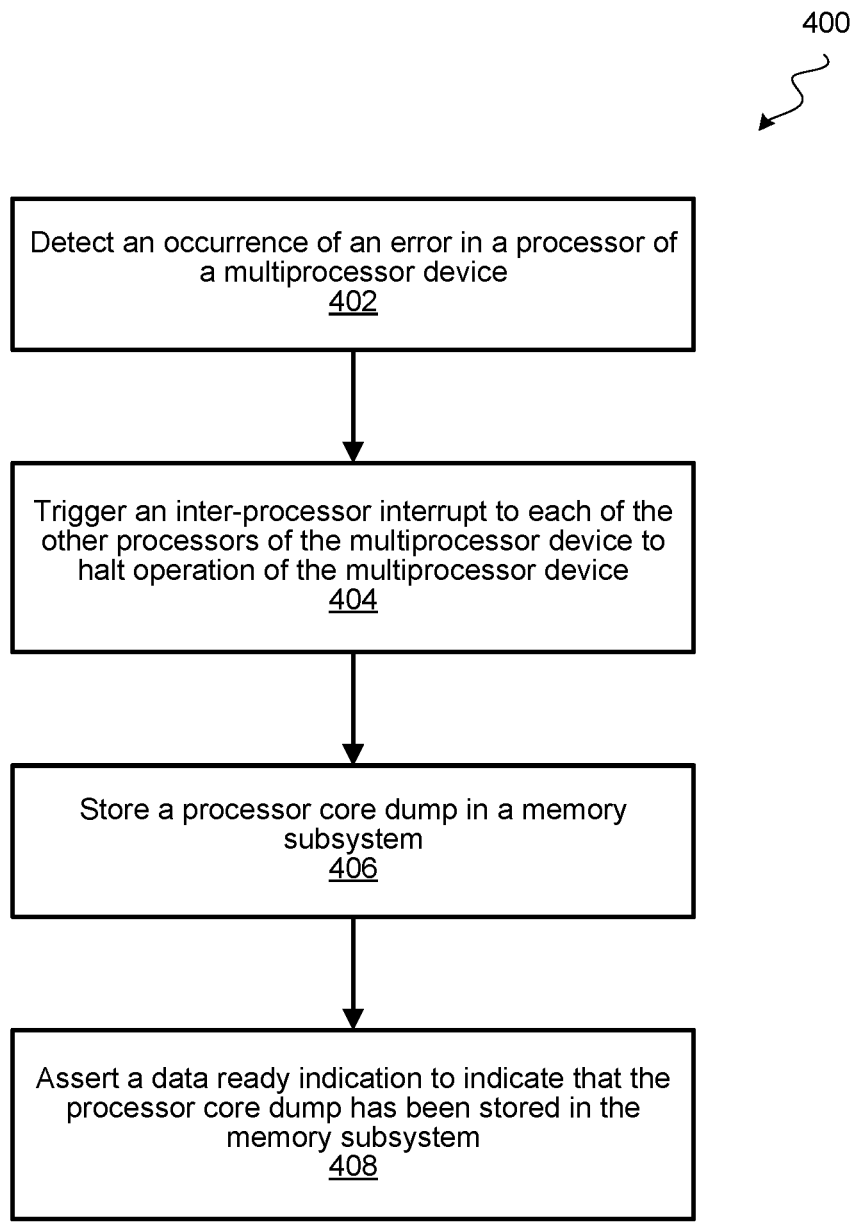
FIG. 4 illustrates a flow diagram of an example of a processor core dump generation process.

FIG. 4 illustrates a flow diagram of an example of a process 400 for generating a processor core dump. Process 400 can be performed, for example, by a processor of a multiprocessor device. In some implementations, process 400 can be implemented using circuitry in the processor, software code (e.g., error handling code, firmware, etc.) executed by the processor, or a combination of both.

Process 400 may begin at block 402 by detecting, in the processor, an occurrence of an error causing a device crash. The error can be, for example: a logical error in the software code being executed by the processor, which triggers an ASSERT instruction; a software error occurring in the processor, which triggers an exception handler; a hardware error occurring in the processor (including any hardware components managed by the processor), which triggers a processor interrupt; or a hybrid error that is a combination of software and hardware errors.

At block 404, the error can trigger an inter-processor interrupt from the processor in which the error occurred to be sent to each of the other processors of the multiprocessor device to halt operation of the multiprocessor device. For example, the error may invoke core dump logic in the processor in which the error occurred. The core dump logic can halt the normal operation of the processor and assert a core dump interrupt to an interrupt controller of the multiprocessor device. The interrupt controller may then forward the core dump interrupt as an inter-processor interrupt to each of the other processors in the multiprocessor system. Upon receiving the inter-processor interrupt, the other processors in the multiprocessor system can halt their normal operation, even when no error in these processors have occurred. In some implementations, by utilizing the inter-processor interrupt mechanism, the processors can be halted without using or relying on an operating system.

At block 406, the core dump logic of the processor in which the error occurred can store a processor core dump in the memory subsystem of the multiprocessor device. For example, the core dump logic of the processor may obtain the values stored in the addressable space (e.g., memory dump) of the processor, as well as the values of hardware block registers and processor registers, and write such content into the memory subsystem. In some implementations, the processor core dump can be written to a specified or reserved space in the memory subsystem. The processor core dump can reflect the state of the processor at the time when the error occurred, and provide an indicate of what instruction or sequence of instructions the processor was executing. In some implementations, the processor core dump may include one or more address space regions. Each address space region may include a local address in an address space of the processor, data retrieved from the local address, and a size of the data retrieved from the local address At block 408, upon completion of writing the processor core dump to the memory subsystem, the processor can assert a data ready indication. The data ready indication provides an indication to other components of the device (e.g., other processors) that the processor core dump has been successfully stored in the memory subsystem. A designated processor of the device that is responsible for copying the processor core dumps to non-volatile memory can check the data ready indication for each of the processor of the device before copying the corresponding processor core dump into the non-volatile memory to generate the device core dump for the device.

Figure 5:
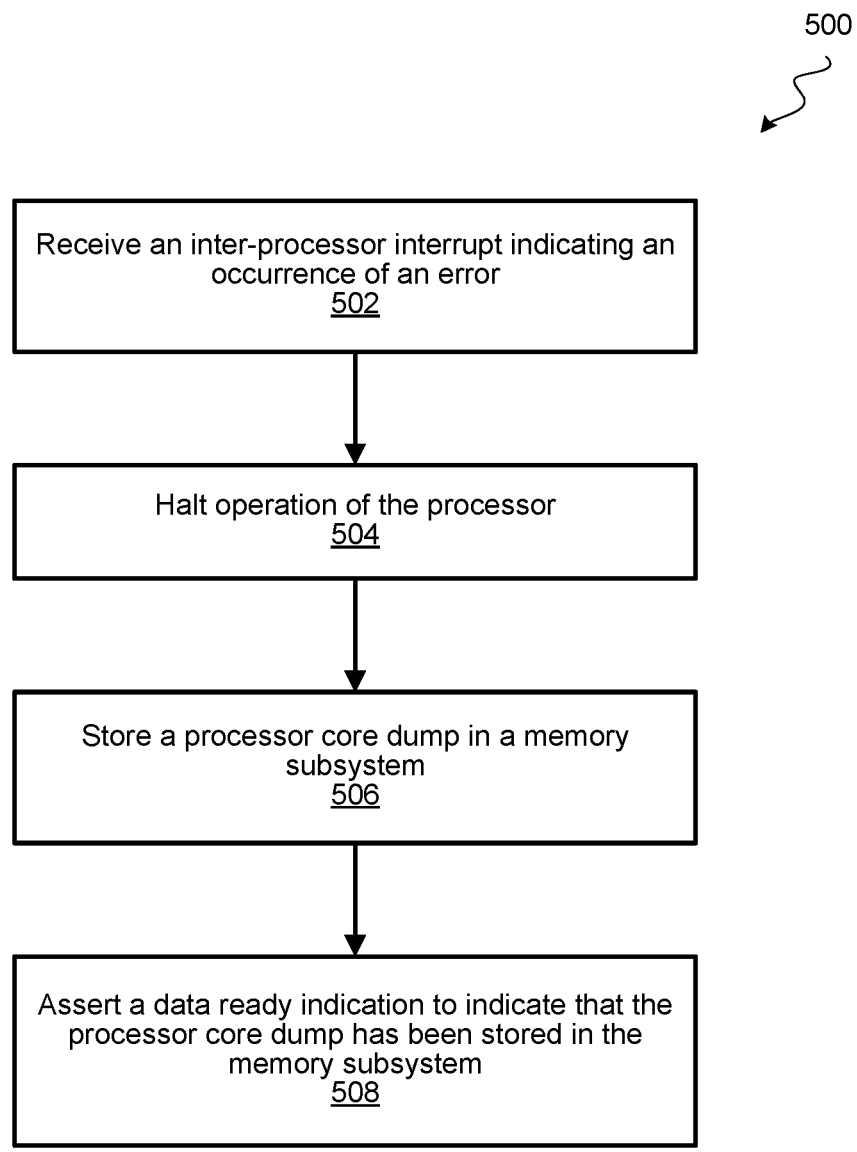
FIG. 5 illustrates a flow diagram of another example of a processor core dump generation process.

FIG. 5 illustrates a flow diagram of another example of a process 500 for generating a processor core dump. Process 500 can be performed, for example, by a processor of a multiprocessor device that is operating normally when an error causing a device crash occurred in a different processor of the device. In some implementations, process 500 can be implemented using circuitry in the processor, software code (e.g., error handling code, firmware, etc.) executed by the processor, or a combination of both.

Process 500 may begin at block 502 by receiving an inter-processor interrupt indicating an occurrence of an error in another processor causing a device crash. The error can be a logical, software, hardware, or hybrid error that occurred in a different processor of the multiprocessor device. In some implementations, the inter-processor interrupt can be received from the interrupt controller of the device, and can be processed by an interrupt handler of the processor receiving the inter-processor interrupt. The inter-processor interrupt can be prioritized over other interrupts and tasks such that the inter-processor interrupt is processed immediately upon receiving it.

At block 504, in response to receiving the inter-processor interrupt, the normal operation of the processor is halted. For example, the inter-processor interrupt can be processed by an interrupt handler of the processor, and the interrupt handler may invoke core dump logic in the processor to immediately stop the normal execution flow in the processor. The core dump logic may then proceed to generate a processor core dump for the processor.

At block 506, the core dump logic of the processor can store a processor core dump in the memory subsystem of the multiprocessor device. For example, the core dump logic may obtain the values stored in the addressable space (e.g., memory dump) of the processor, as well as the values of the hardware block registers and processor registers, and write such content into the memory subsystem. In some implementations, the processor core dump can be written to a specified or reserved space in the memory subsystem. The processor core dump can reflect the state of the processor at the time when the inter-processor interrupt is received, which is close in time to when the error occurred. In some implementations, the processor core dump may include one or more address space regions. Each address space region may include a local address in an address space of the processor, data retrieved from the local address, and a size of the data retrieved from the local address At block 508, upon completion of writing the processor core dump to the memory subsystem, the processor can assert a data ready indication. The data ready indication provides an indication to other components of the device (e.g., other processors) that the processor core dump has been successfully stored in the memory subsystem. A designated processor of the device that is responsible for copying the processor core dumps to non-volatile memory can check the data ready indication for each of the processor of the device before copying the corresponding processor core dump into the non-volatile memory to generate the device core dump for the device.

Figure 6:
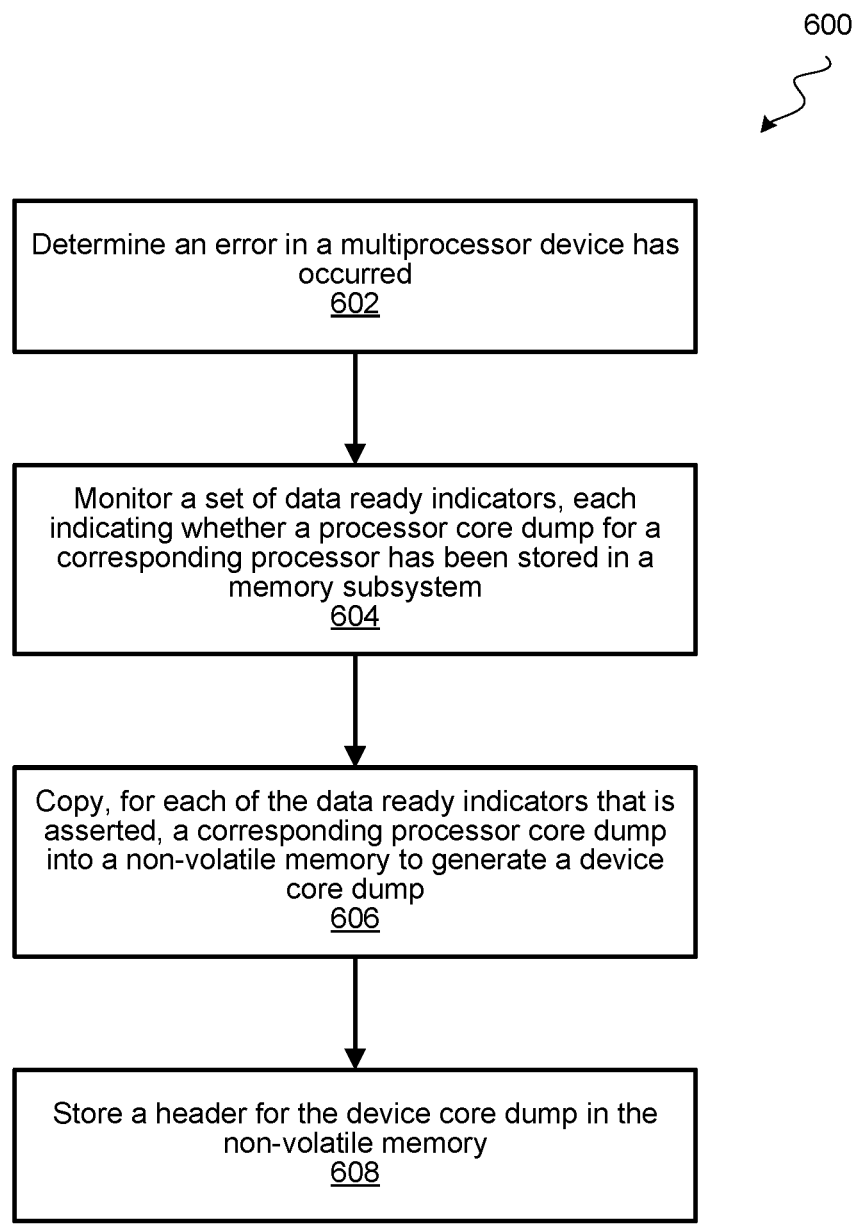
FIG. 6 illustrates a flow diagram of an example of a device core dump generation process.

FIG. 6 illustrates a flow diagram of an example of a process 600 for generating a device core dump. Process 600 can be performed, for example, by a designated processor of a multiprocessor device that is responsible for copying the processor core dumps from the memory subsystem of the multiprocessor electronic device into the non-volatile memory. In some implementations, process 600 can be implemented using circuitry in the processor, software code (e.g., error handling code, firmware, etc.) executed by the processor, or a combination of both.

Process 600 may begin at block 602 by determining that an error in the multiprocessor device has occurred. The determination can be made by detecting an error that occurred in the designated processor causing a device crash, or by receiving an inter-processor interrupt indicating an occurrence of an error in another processor causing a device crash. The error can be a logical, software, hardware, or hybrid error.

At block 604, in response to determining that an error had occurred, the designated processor can monitor a set of data ready indicators, in which each indicator indicates whether a processor core dump for a corresponding processor in the multiprocessor device has been stored in a memory subsystem (e.g., random access memory). Each data ready indicators can be, for example, a data ready bit stored in the memory subsystem or in a register. The designated processor may also store its own processor core dump in the memory subsystem and asserts its corresponding data ready indicator. In some implementations, give that the designated processor is responsible for copying the processor core dumps into non-volatile memory, the designated processor may bypass storing its own processor core dump in the memory subsystem and write directly to non-volatile memory.

At block 606, for each of the data ready indicators that is asserted, the designated processor can copy the processor core dump for the corresponding processor from the memory subsystem into the non-volatile memory to generate a device core dump. The device core dump may include multiple processor sections corresponding to the processor core dumps stored by the processors of the device. Each of the processor sections may include one or more address space regions. Each address space region may include a local address in an address space of the corresponding processor, data retrieved from the local address, and a size of the data retrieved from the local address.

At block 608, in addition to store each of the processor core dumps in the non-volatile memory, the designated processor may also store a header for the device core dump in the non-volatile memory. The header may include a value representing the number of processor sections in the device core dump. The header may also include a sequence number associated with the device core dump. For example, the device core dump being generated can be one of multiple device core dumps being sequentially stored in the non-volatile memory in response to a sequence of errors that repeatedly cause the device to crash. The sequence number can indicate the order in which the device core dumps were generated when multiple device crashes have occurred.

The header may also include a capacity flag to indicated whether the non-volatile memory has sufficient capacity to store a subsequent device core dump. For example, when the designated processor completes storing the device core dump in the non-volatile memory, the designated processor can determine if there is enough remaining unused space to store another device core dump. If there is sufficient space, the designated processor can determine not to set the capacity flag or leave the capacity flag deasserted in the header of the current device core dump. If there is insufficient space, the designated processor can determine to set or assert the capacity flag in the header of the current device core dump. The capacity flag can be used during device reboot to determine the mode of operation.

Figure 7:
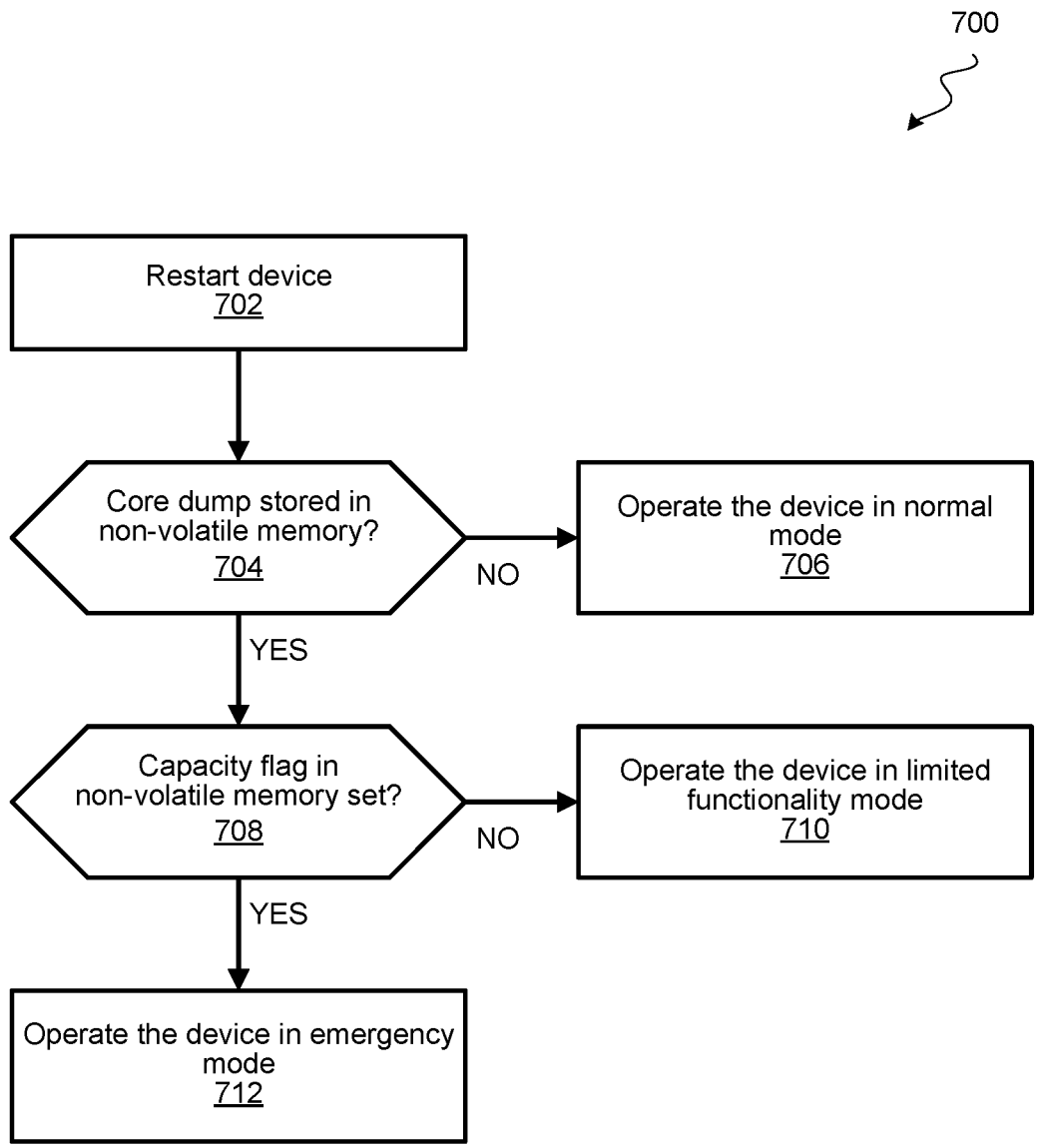
FIG. 7 illustrates a flow diagram of an example of a device restart process.

FIG. 7 illustrates a flow diagram of an example of a process 700 for device boot. Process 700 can be performed, for example, by a device that has the capability to store a device core dump in response to an error causing a device crash. Process 700 can be implemented, for example, as part of the boot code (e.g., firmware) executed by a processor.

Process 700 may begin at block 702 by restarting the device. The device can be a multiprocessor device as described herein. The restart can be performed, for example, by asserting a reset or by power cycling the device. At block 704, a determination is made as to whether any device core dump has been stored in the non-volatile memory of the device. This determination can be made by checking if any valid data is stored in the designated area of the non-volatile memory for storing core dumps. If no device core dump has been stored, the device can be operated in the normal mode of operation at block 706.

As mentioned above, the capacity flag in the header of the most-recently stored device core dump can be used when the device restarts to determine which mode the device boots into. Hence, if there is any device core dump present in the non-volatile memory, the capacity flag in the header of the most-recent device core dump can be checked at block 708. If the capacity is not asserted, the device can reboot into a limited functionality mode at block 710, which prevents configuration changes from being made to the multiprocessor device. If the capacity flag of the most-recent device core dump is asserted, the device can reboot into an emergency mode of operation at block 712 to transfer the device core dump(s) from the device to an external component for further debug or analysis. This device core dump(s) are read out from the non-volatile memory, because the non-volatile memory may not be able to store information related to any subsequent crashes.

Figure 8:
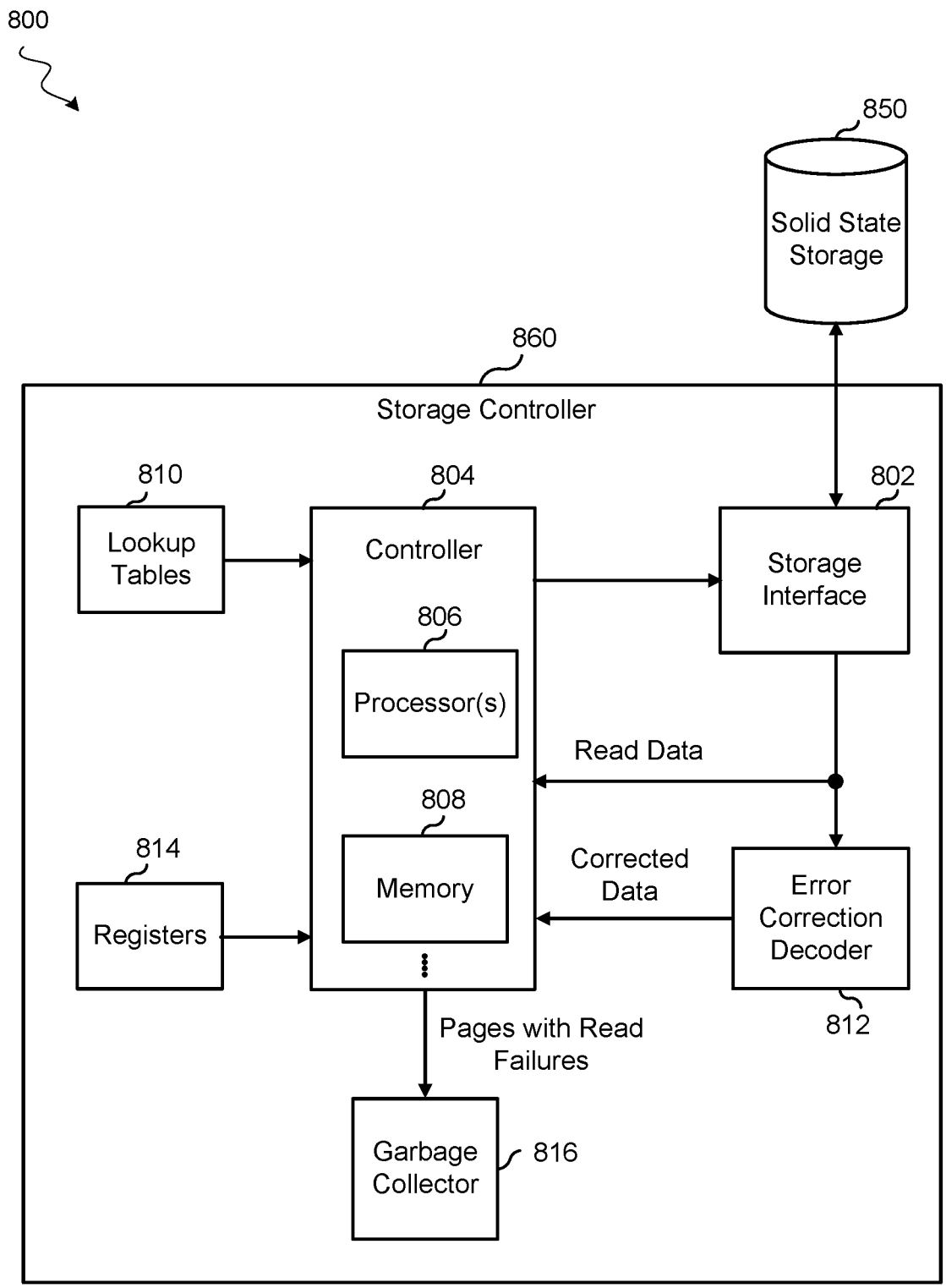
FIG. 8 illustrates a block diagram of an example of a storage device.

FIG. 8 is a simplified block diagram illustrating a solid-state storage system, which can be an example of an electronic device utilizing the core dump techniques described herein. As shown, solid-state storage system 800 can include a solid-state storage device 850 and a storage controller 860. Storage controller 860, also referred to as a memory controller, is one example of a system that performs the techniques described herein. In some embodiments, storage controller 860 can be implemented on a semiconductor device, such as an application-specific integrated circuit (ASIC) or field programmable gate array (FPGA). Some of the functions can also be implemented in firmware or software. Solid-state storage system 800 is an example of a solid-state drive (SSD).

Controller 804 can include one or more processors 806 and memories 808 for performing the control functions described above. Storage controller 860 can also include lookup tables 810, which can include a table for degraded blocks and a table for bad blocks, etc. Registers 814 can be used to store data for control functions, such as threshold values for degraded block counts.

Controller 804 can be coupled to solid-state storage 850 through a storage interface 802. Error-correction decoder 812 (e.g., an LDPC decoder or a BCH decoder) can perform error-correction decoding on the read data and send the corrected data to controller 804. Controller 804 can identify the pages with read failures to garbage collector 816, which performs corrective processing on those pages (e.g., by copying the data, with or without error correction decoding, to a new location).

Figure 9:
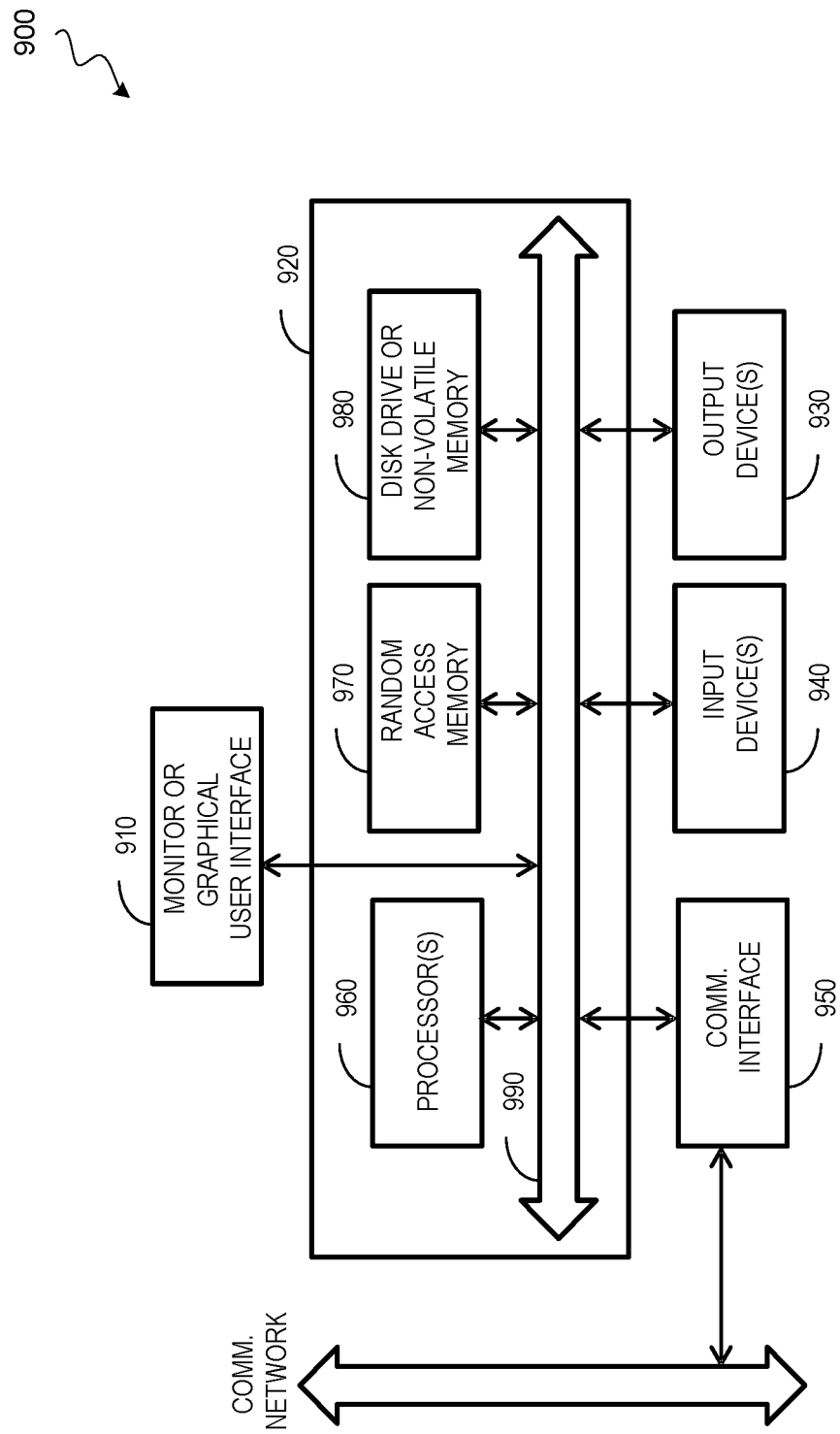
FIG. 9 illustrates a block diagram of an example of a computing device.

FIG. 9 is a simplified block diagram illustrating an apparatus that may be used to implement various aspects of the present disclosure. In the example shown in FIG. 9, the apparatus can be a computer system 900, which may typically include a monitor 910, a computer 920, user output devices 930, user input devices 940, communications interface 950, and the like.

As shown in FIG. 9, computer 920 may include a processor(s) 960 that communicates with a number of peripheral devices via a bus subsystem 990. These peripheral devices may include user output devices 930, user input devices 940, communications interface 950, and a storage subsystem, such as random-access memory (RAM) 970 and disk drive 980. As an example, a disk drive 980 can include SSD implemented with non-volatile memory devices, such as solid-state storage system 800 in FIG. 8.

User input devices 940 include all possible types of devices and mechanisms for inputting information to computer system 920. These may include a keyboard, a keypad, a touch screen incorporated into the display, audio input devices such as voice recognition systems, microphones, and other types of input devices. In various embodiments, user input devices 940 are typically embodied as a computer mouse, a trackball, a trackpad, a joystick, a wireless remote, a drawing tablet, a voice command system, an eye-tracking system, and the like. User input devices 940 typically allow a user to select objects, icons, text, and the like that appear on the monitor 910 via a command, such as a click of a button or the like.

User output devices 930 include all possible types of devices and mechanisms for outputting information from computer 920. These may include a display (e.g., monitor 910), non-visual displays, such as audio output devices.

Communications interface 950 provides an interface to other communication networks and devices. Communications interface 950 may serve as an interface for receiving data from and transmitting data to other systems. Embodiments of communications interface 950 typically include an Ethernet card, a modem (telephone, satellite, cable, integrated services digital network (ISDN)), (asynchronous) digital subscriber line (DSL) unit, FireWire interface, USB interface, and the like. For example, communications interface 950 may be coupled to a computer network, to a FireWire bus, or the like. In other embodiments, communications interfaces 950 may be physically integrated on the motherboard of computer 920 and may be a software program, such as soft DSL or the like.

In various embodiments, computer system 900 may also include software that enables communications over a network such as the Hypertext Transfer Protocol (HTTP), the Transmission Control Protocol and the Internet Protocol (TCP/IP), the Real Time Streaming Protocol and Real-time Transport Protocol (RTSP/RTP), and the like. In alternative embodiments of the present disclosure, other communications software and transfer protocols may also be used, for example Internetwork Packet Exchange (IPX), User Datagram Protocol (UDP), or the like. In some embodiments, computer 920 includes one or more Xeon microprocessors from Intel as processor(s) 960. Further, in one embodiment, computer 920 includes a UNIX-based operating system.

RAM 970 and disk drive 980 are examples of tangible media configured to store data, such as embodiments of the present disclosure, including executable computer code, human-readable code, or the like. Other types of tangible media include floppy disks, removable hard disks, optical storage media, such as CD-ROMS, DVDs and bar codes, semiconductor memories, such as flash memories, non-transitory read-only memories (ROMs), battery-backed volatile memories, networked storage devices, and the like. RAM 970 and disk drive 980 may be configured to store the basic programming and data constructs that provide the functionality of the present disclosure.

Software code modules and instructions that provide the functionality of the present invention may be stored in RAM 970 and disk drive 980. These software modules may be executed by processor(s) 960. RAM 970 and disk drive 980 may also provide a repository for storing data used in accordance with the present disclosure.

RAM 970 and disk drive 980 may include a number of memories, including a main RAM for storage of instructions and data during program execution and a ROM in which fixed non-transitory instructions are stored. RAM 970 and disk drive 980 may include a file storage subsystem providing persistent (non-volatile) storage for program and data files. RAM 970 and disk drive 980 may also include removable storage systems, such as removable flash memory.

Bus subsystem 990 provides a mechanism for letting the various components and subsystems of computer 920 communicate with each other as intended. Although bus subsystem 990 is shown schematically as a single bus, alternative embodiments of the bus subsystem may utilize multiple busses. Bus system 990 may be a Peripheral Component Interconnect (PCI) Express bus that may be implemented using Peripheral Component Interconnect Express (PCIe) physical layer (PHY) embodiments of the present disclosure.

FIG. 9 is representative of a computer system capable of embodying the present disclosure. It will be readily apparent to one of ordinary skill in the art that many other hardware and software configurations are suitable for use with the present disclosure. For example, the computer may be a desktop, portable, rack-mounted, or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; and the like. Further, other types of operating systems are contemplated, such as Windows®, WindowsXP®, WindowsNT®, or the like from Microsoft Corporation; Solaris from Sun Microsystems; LINUX; UNIX; and the like. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, and magnetic and optical storage devices, such as disk drives, magnetic tape, CDs, DVDs, or other media, now known or later developed, that are capable of storing code and/or data. Hardware modules or apparatuses described herein include, but are not limited to, ASICs, FPGAs, dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The embodiments disclosed herein are not to be limited in scope by the specific embodiments described herein. Various modifications of the embodiments of the present disclosure, in addition to those described herein, will be apparent to those of ordinary skill in the art from the foregoing description and accompanying drawings. Further, although some of the embodiments of the present disclosure have been described in the context of a particular implementation in a particular environment for a particular purpose, those of ordinary skill in the art will recognize that the disclosure's usefulness is not limited thereto and that the embodiments of the present disclosure can be beneficially implemented in any number of environments for any number of purposes.

What is claimed is:

1. A method comprising:
   detecting an occurrence of an error in a processor of a multiprocessor device having a plurality of processors;
   in response to the error, triggering an inter-processor interrupt from the processor in which the error occurred to each of the other processors of the multiprocessor device to halt operation of the multiprocessor device;
   storing a plurality of processor core dumps in a memory subsystem, the plurality of processor core dumps corresponding to the plurality of processors in the multiprocessor device including one or more processors that does not have the error;
   determining that a data ready indication for each of the processors has been set to indicate that the corresponding processor core dump has been stored in the memory subsystem; and
   copying the plurality of processor core dumps from the memory subsystem to a non-volatile memory to generate a device core dump in the non-volatile memory.

2. The method of claim 1, wherein the operation of the multiprocessor device is halted without using an operating system.

3. The method of claim 1, wherein the device core dump includes a header and a plurality of processor sections.

4. The method of claim 3, wherein the header includes a value representing the number of processor sections in the device core dump.

5. The method of claim 3, wherein each of the processor sections includes one or more address space regions, each address space region including a local address in an address space of the corresponding processor, data retrieved from the local address, and a size of the data retrieved from the local address.

6. The method of claim 3, further comprising:
   determining that the non-volatile memory has sufficient capacity to store a subsequent device core dump; and
   determining not to set a capacity flag in the header of the device core dump.

7. The method of claim 6, further comprising:
   restarting the multiprocessor device;
   determining that a device core dump has been stored in the non-volatile memory and that the capacity flag has not been set; and
   operating the multiprocessor device in a limited functionality mode that prevents configuration changes from being made to the multiprocessor device.

8. The method of claim 3, further comprising:
   determining that the non-volatile memory lacks sufficient capacity to store a subsequent device core dump; and
   setting a capacity flag in the header of the device core dump.

9. The method of claim 8, further comprising:
   restarting the multiprocessor device;
   determining that a device core dump has been stored in the non-volatile memory and that the capacity flag has been set; and
   operating the multiprocessor device in an emergency mode that disables operations of the multiprocessor device while allowing the device core dump to be transferred externally from the multiprocessor device.

10. The method of claim 9, further comprising:
    restarting the multiprocessor device after a predetermined timeout duration has elapsed in the emergency mode of operation.

11. A device comprising:
    a non-volatile memory;
    a memory subsystem;
    a plurality of processors each having core dump logic operable to store a processor core dump in the memory subsystem for the corresponding processor in response to an occurrence of an error in the device even when the error did not occur in the corresponding processor, and set a data ready indication in the memory subsystem upon completion of storing the processor core dump; and
    an interrupt controller operable to broadcast an inter-processor interrupt in response to the occurrence of the error to halt operation of the device,
    wherein a designated processor of the device is operable to generate a device core dump by copying the processor core dump of each processor from the memory subsystem into the non-volatile memory upon verifying the data ready indication for each processor has been set.

12. The device of claim 11, wherein the device core dump includes a header and a plurality of processor sections.

13. The device of claim 12, wherein the header includes a value representing the number of processor sections in the device core dump.

14. The device of claim 12, wherein each of the processor sections includes one or more address space regions, each address space region including a local address in an address space of the corresponding processor, data retrieved from the local address, and a size of the data retrieved from the local address.

15. The device of claim 12, wherein the header further includes a sequence number of the device core dump.

16. The device of claim 12, wherein the header further includes a capacity flag indicating whether the non-volatile memory has sufficient capacity to store a subsequent device core dump.

17. The device of claim 16, wherein the device is operable to select between a limited functionality mode and an emergency mode of operation based on the capacity flag upon restarting after the device core dump.

18. A method comprising: determining, by a designated processor of a multiprocessor device having a plurality of processors, an occurrence of an error in the multiprocessor device by receiving an inter-processor interrupt at the designated processor; monitoring, by the designated processor, a set of data ready indicators, each of the data ready indicators indicating whether a processor core dump for a corresponding processor in the plurality of processors of the multiprocessor device has been stored in a memory subsystem, wherein the plurality of processors storing respective processor core dumps includes one or more processors that does not have the error; for each of the data ready indicators that is asserted, copying, by the designated processor, a processor core dump for the corresponding processor into a non-volatile memory to generate a device core dump; and storing, by the designated processor, a header for the device core dump in the non-volatile memory.

19. The method of claim 18, wherein the device core dump is one of a plurality of device core dumps sequentially stored in the non-volatile memory in response to a sequence of errors.

\* \* \* \* \*